United States Patent [19]

Horiuchi et al.

[11] Patent Number: 5,047,287

[45] Date of Patent: Sep. 10, 1991

[54] DIAPHRAGM

[75] Inventors: Noriyuki Horiuchi; Hiroyuki Kobayashi, both of Nishikasugai, Japan

[73] Assignee: Toyoda Gosei Co., Ltd., Nishikasugai, Japan

[21] Appl. No.: 290,321

[22] Filed: Dec. 27, 1988

[30] Foreign Application Priority Data

Dec. 27, 1987 [JP] Japan ............................... 62-331407

[51] Int. Cl.$^5$ ..................... B32B 7/12; B32B 27/08; B32B 31/12; B32B 31/20; B32B 33/00
[52] U.S. Cl. .................................... 428/248; 156/250; 156/331.1; 415/232; 417/DIG. 1; 428/252; 428/286; 428/287; 428/421
[58] Field of Search ................ 156/250; 428/248, 252, 428/286, 287, 421

[56] References Cited

U.S. PATENT DOCUMENTS 4,606,952  8/1986  Sugimoto et al. .................. 428/36.8

FOREIGN PATENT DOCUMENTS 255823  11/1987  Japan .

Primary Examiner—James C. Cannon
Attorney, Agent, or Firm—Cushman, Darby & Cushman

[57] ABSTRACT

A diaphragm, suitable for use in automotive applications, which comprises a base fabric having bonded to at least one surface a fluororubber layer by an adhesive which includes an acrylonitrile-butadiene or acrylonitrile-isoprene rubber having an amino group. There is also a described a method of making the diaphragm.

9 Claims, 1 Drawing Sheet

DIAPHRAGM

BACKGROUND OF THE INVENTION

The present invention relates to a diaphragm having at least one fluororubber (referred to as FKM) layer bonded to a base fabric. This diaphragm is suitable for a pressure regulator, a fuel pump, etc. of an automobile fuel line.

When a diaphragm is assembled in the automobile fuel line, the diaphragm is required to have resistance to gasoline, especially resistance to deteriorated gasoline, resistance to low temperatures and also resistance to heat. These resistance requirements are severe. To meet these requirements, a diaphragm having FKM layers is preferable.

However, there has been no adhesive with which one can accomplish a strong adhesion between the FKM layer and the base fabric. Therefore, it has been considered difficult to make a diaphragm having the FKM layer which has high bending fatigue strength at its moving portion.

SUMMARY OF THE INVENTION

It is an object of this invention to provide a diaphragm having resistance to gasoline, especially deteriorated gasoline as well as resistance to low temperatures and heat.

It is another object of this invention to provide a diaphragm having high bending fatigue strength at its moving portion.

The diaphragm according to the present invention comprises a base fabric, at least one FKM layer bonded to a base fabric and an adhesive including an acrylonitrile-butadiene rubber having amino group (referred to as amino-NBR) to adhere to the base fabric to the FKM layer.

DETAILED DESCRIPTION OF THE INVENTION

Figure 1:
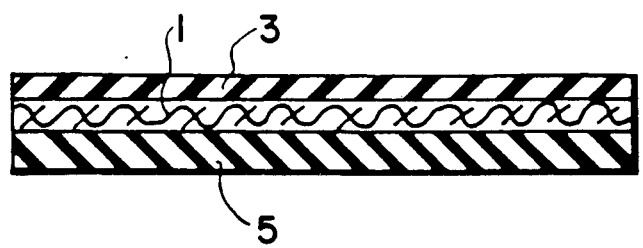
FIG. 1 is a sectional view showing a diaphragm of an embodiment of the present invention.

As shown in FIG. 1, both surfaces of a base fabric 1 are covered by FKM layers 3 and 5.

FKM layers 3, 5 are made of a vulcanized fluororubber such as "vinylidene fluoride-propylene hexafluoride copolymer" and "vinylidene fluoride-propylene hexafluoride-ethylene tetrafluoride terpolymer", etc.

The base fabric 1 may be a woven (twill, plain, etc) or non-woven fabric made from synthetic fiber such as nylon fiber, polyester fiber, etc. or natural fiber such as cotton.

An adhesive containing amino-NBR as a main component is applied to both surfaces of the base fabric 1.

The amino-NBR is obtained by copolymerization of the following functional monomer <A> having an amino group with butadiene (or isoprene) and acrylonitrile.

<A> Dimethylaminoethyl acrylate
Dimethylaminoethyl methacrylate
Diethylaminoethyl acrylate
Diethylaminoethyl methacrylate
Dipropylaminoethyl acrylate
Dipropylaminoethyl methacrylate
Dibutylaminoethyl acrylate
Dibutylaminoethyl methacrylate
Dibutylaminopropyl methacrylate
Ethylaminoethyl methacrylate
etc.

The quantity of the functional monomer in the amino-NBR should be 0.5 to 20 wt % and preferably 1 to 15 wt %. If it is less than 0.5 wt %, the adhesion between the base fabric 1 and the FKM layers 3,5 is not sufficient. If the amount is in excess of 20 wt %, the adhesion strength does not increase. The amount of acrylonitrile in the amino-NBR is preferably 15 to 55 wt % so as to achieve resistance to low temperatures. The balance of the amino-NBR is essentially butadiene or isoprene (i.e. from 25 to 84.5%), but it will be appreciated that small amounts of conventional additives may be included in the amino-NBR (e.g. stabilizer, pigment, etc.)

The polymerization is usually carried out by emulsion polymerization, in which the polymerization initiator used may be a radical catalyst such as peroxide, persulfate and azo compound; the emulsifier used may be a surface active agent such as fatty acid salt soap and sulfonate salt soap; and the molecular weight modifier used may be a sulfer compound such as n-dodecanethiol, t-dodecanethiol and dipropylxanthogendisulfide or a halogen compound such as carbon tetrachloride and carbon tetrabromide. Polymerization is carried out in an oxygen-free atmosphere at 0° to 80° C. The resulting latex (amino-NBR) is coagulated with an acid or neutral aqueous solution of a metal salt or alcohol, followed by washing with neutral of alkaline water.

The adhesive containing the amino-NBR as a main component is prepared by dissolving the amino-NBR in a suitable solvent such as methylethylketon (MEK). The adhesive preferably also may contain an isocyanate-type adhesive which is, for example, commercially available under the trade name of Chemlock 402 by Lord Co., Ltd. The amount of isocyanate-type adhesive which may be used may range suitably from 20 to 300 grams per 100 grams of the amino-NBR. If less than 20 grams of the isocyanate-type adhesive is used, the adhesion property is not significantly improved, and amounts in excess of 300 grams, results in a loss of adhesion properties.

The adhesive is applied on the base fabric 1 by a conventional method such as splaying, dipping, roll coating, brush coating, etc.

The diaphragm of the present invention is produced by the following procedures:

a) preparing FKM compound by blending FKM and the following conventional ingredients: an inorganic filler such as carbon black, silica, metal oxide, etc; and organic filler such as lignin; a plasticizer; and antioxidant; a coloring agent; a curing agent such as sulfer, peroxide, etc.;

b) applying the adhesive containing the amino-NBR as a main component to the base fabric 1;

c) topping the FKM compound on at least one surface of the base fabric 1 by using a calendering rolls;

d) vulcanizing the sheet obtained by the process c) by a press molding machine; and e) cutting the desired diaphragm out of the vulcanized sheet by a punching machine.

Figure 2:
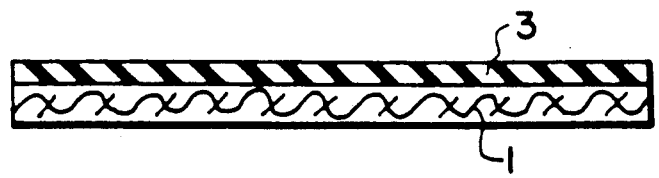
FIG. 2 is a sectional view showing a diaphragm of another embodiment of the present invention.

The diaphragm of the present invention is designed to have not only a three-layer (FKM layers 3,5 and the base fabric 1) composite as shown in FIG. 1, but also a two-layer composite as shown in FIG. 2 which has only one FKM layer 3 on a surface of the base fabric 1. Furthermore, one FKM layer can be substituted by an acrylonitrile-butadiene rubber (NBR) layer or a hydrogenated NBR layer which has excellent oil resistance and ozone resistance in the case only one surface of the diaphragm is required to have deteriorated gasoline resistance.

Figure 3:
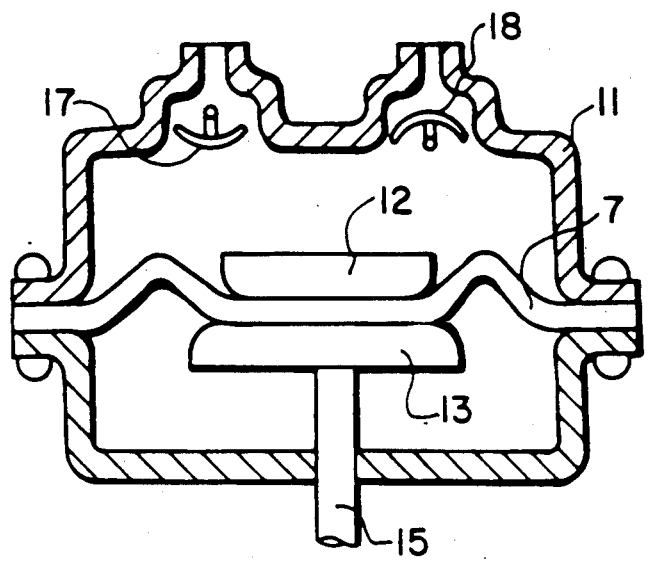
FIG. 3 is a sectional view of an automobile fuel pump assembled with a diaphragm of the present invention.

The diaphragm 7 of the present invention may be assembled in an automobile pump as shown in FIG. 3, which comprises a casing 11, diaphragm attachment dishes 12 and 13, a moving rod 15, an inlet valve 17 and an outlet valve 18.

The invention is now described with reference to Examples and Comparative Example.

The test specimens in Examples and Comparative Example were prepared by the following procedures:

1) preparing the FKM compound by blending the following material;

| | | |
|---|---|---|
| FKM (VITON E-45, trade name of Dupont) | 100 | grams |
| Carbon black | 13 | grams |
| MgO | 3 | grams |
| Ca(OH) | 6 | grams |
| Polyol | 60 | grams |
| Phosphonium salt | 0.6 | grams |

2) applying the adhesives shown in Table 1 to the both surfaces of the fabric made of Nylon-6 (0.4 mm thickness, plain weave);
3) topping the FKM compound on the both surface of the fabric and then cutting the 76 mm diaphragm out of it;
4) vulcanizing the diaphragm by press molding machine under the pressure of 65 Kgf/cm at the temperature of 176° C. for 10 min. and post-curing it in a heat oven at the temperature of 150° C. for 2 hrs.; and
5) cutting the rectangular test specimen, having 70 mm length and 25 mm width, out of the diaphragm.

Table 1 shows the results of the peeling test (peeling the FKM layer from the base fabric) which was carried out according to JIS K 6301.

TABLE 1

| | Comparative Example | Example 1 | Example 2 |
|---|---|---|---|
| Adhesive | 100 grams of NBR dissolved in 300 grams of MEK | 100 grams of amino-NBR containing 7 wt % of diethylaminoethyl-methacrylate dissolved in 150 grams of MEK | 100 grams of amino-NBR containing 7 wt % of diethylaminoethyl-methacrylate and 200 grams of isocyanate type adhesive (Chemlock 402) dissolved in 150 grams of MEK |
| Peeling strength (Kgf/25 mm) | 0.7 | 5.0 | 8.0 |

The examples 1 and 2 of the present invention have higher peeling strength than the comparative example, and especially the example 2 including isocyanate type adhesive has much higher peeling strength.

As an additional comparison, the same test was carried out in a conventional diaphragm having NBR layers on the both surfaces of the base fabric. The peeling strength of the conventional diaphragm was 3.8 Kgf/25 mm which shows that the diaphragm of the present invention has the higher peeling strength than that of the conventional one.

The diaphragm of the present invention has high bending fatigue strength at its moving portion.

What is claimed is:

1. A diaphragm which comprises
   a) a base fabric;
   b) at least one fluororubber layer bonded to said base fabric, and
   c) an adhesive including an acrylonitrile-butadiene rubber or acrylonitrile-isoprene rubber having an amino group to adhere said base fabric to said fluororubber layer,
   wherein said adhesive further includes an isocyanate-type adhesive.

2. The diaphragm according to claim 1, wherein said acrylonitrile-butadiene rubber having amino group is a copolymer of at least one functional monomer selected from the group consisting of:
   dimethylaminoethyl acrylate,
   dimethylaminoethyl methacrylate,
   diethylaminoethyl acrylate,
   diethylaminoethyl methacrylate,
   dipropylaminoethyl acrylate,
   dipropylaminoethyl methacrylate,
   dibutylaminoethyl acrylate,
   dibutylaminoethyl acrylate,
   dibutylaminoethyl methacrylate,
   dibutylaminopropyl methacrylate,
   and a ethylaminoethyl methacrylate with butadiene or isoprene, and acrylonitrile.

3. The diaphragm according to claim 2 wherein the quantity of said functional monomer in said acrylonitrile-butadiene rubber having amino group is 0.5 wt % to 20 wt %.

4. The diaphragm according to claim 1, wherein the quantity of said isocyanate-type adhesive is 20 to 300 grams per 100 grams of said acrylonitrile-butadiene rubber or acrylonitrile-isoprene rubber having an amino group.

5. The diaphragm according to claim 2 wherein said adhesive further includes an isocyanate-type adhesive.

6. The diaphragm according to claim 5 wherein the quantity of said isocyanate-type adhesive is 20 to 300 grams per 100 grams of said acrylonitrile-butadiene rubber or acrylonitrile-isoprene rubber having an amino group.

7. A method for producing a diaphragm having improved adhesive characteristics which comprises:

a) binding a layer of fluororubber to at least one surface of a base fabric with an adhesive including an isocyanate-type adhesive and formed from an acrylonitrile-butadiene or acrylonitrile-isoprene rubber having an amino group to form a sheet;
b) vulcanizing the sheet; and
c) cutting the sheet to obtain a diaphragm.

8. A method according to claim 7 wherein the sheet is vulcanized prior to cutting.

9. A method according to claim 8 wherein the sheet is cut prior to vulcanizing.

* * * * *